(12) United States Patent
Gil et al.

(10) Patent No.: US 11,795,249 B2
(45) Date of Patent: Oct. 24, 2023

(54) VINYL CHLORIDE-BASED COPOLYMER AND PREPARATION METHOD THEREOF

(71) Applicant: HANWHA SOLUTIONS CORPORATION, Seoul (KR)

(72) Inventors: Moon Soo Gil, Anyang (KR);
Chul-Woong Lee, Daejeon (KR);
Hyeok Chil Kwon, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 15 days.

(21) Appl. No.: 17/256,733

(22) PCT Filed: Jul. 24, 2019

(86) PCT No.: PCT/KR2019/009193
§ 371 (c)(1),
(2) Date: Dec. 29, 2020

(87) PCT Pub. No.: WO2020/027490
PCT Pub. Date: Feb. 6, 2020

(65) Prior Publication Data
US 2021/0261810 A1    Aug. 26, 2021

(30) Foreign Application Priority Data

Jul. 30, 2018  (KR) .................. 10-2018-0088888

(51) Int. Cl.
*C08F 214/06* (2006.01)
*C08F 222/10* (2006.01)
(Continued)

(52) U.S. Cl.
CPC ............ *C08F 214/06* (2013.01); *C08F 12/08* (2013.01); *C08F 36/04* (2013.01); *C08F 212/10* (2013.01);
(Continued)

(58) Field of Classification Search
CPC .................. C08F 214/06; C08F 216/02; C08F 216/1433; C08F 220/20; C08F 220/286;
(Continued)

(56) References Cited

U.S. PATENT DOCUMENTS

| 3,969,328 A | 7/1976 | Kurz |
| 4,210,739 A | 7/1980 | Gallagher et al. |

(Continued)

FOREIGN PATENT DOCUMENTS

| EP | 2881444 A1 | 6/2015 |
| JP | 60015471 A | 1/1985 |

(Continued)

OTHER PUBLICATIONS

International Search Report dated Nov. 11, 2019.
European Search Report dated Mar. 22, 2022.

*Primary Examiner* — Ling Siu Choi
*Assistant Examiner* — David L Miller
(74) *Attorney, Agent, or Firm* — Harvest IP Law, LLP

(57) ABSTRACT

Provided are a novel structure of a copolymer, a preparation method thereof, a vinyl chloride-based resin composition including the copolymer, and a coating ink including the vinyl chloride-based resin composition. According to the present invention, when the vinyl chloride-based resin composition including the copolymer is used, compatibility with ethylene vinyl acetate is excellent, and ink dispersibility and ink color are also excellent.

19 Claims, 1 Drawing Sheet

(51) Int. Cl.
*C09D 127/06* (2006.01)
*C09D 135/02* (2006.01)
*C08F 236/04* (2006.01)
*C08F 236/08* (2006.01)
*C08F 12/08* (2006.01)
*C08F 236/10* (2006.01)
*C08F 36/04* (2006.01)
*C08F 236/12* (2006.01)
*C08F 212/10* (2006.01)
*C08K 5/06* (2006.01)
*C08F 36/08* (2006.01)
*C08F 36/06* (2006.01)

(52) U.S. Cl.
CPC ........ *C08F 222/102* (2020.02); *C08F 236/04* (2013.01); *C08F 236/045* (2013.01); *C08F 236/08* (2013.01); *C08F 236/10* (2013.01); *C08F 236/12* (2013.01); *C09D 127/06* (2013.01); *C09D 135/02* (2013.01); *C08F 36/06* (2013.01); *C08F 36/08* (2013.01); *C08K 5/06* (2013.01)

(58) Field of Classification Search
CPC ................ C08F 220/306; C08F 222/14; C08F 222/145; C08F 222/16; C08F 222/165
See application file for complete search history.

(56) References Cited

U.S. PATENT DOCUMENTS

| | | | | |
|---|---|---|---|---|
| 9,340,719 | B2 * | 5/2016 | Shimada | ............. D06M 15/564 |
| 2012/0309883 | A1 * | 12/2012 | Inoue | ................ C08F 220/1818 |
| | | | | 524/377 |
| 2017/0283533 | A1 | 10/2017 | Ahn et al. | |
| 2017/0291975 | A1 | 10/2017 | Ahn et al. | |

FOREIGN PATENT DOCUMENTS

| | | | | | |
|---|---|---|---|---|---|
| JP | 04038618 | A | | 2/1992 | |
| JP | 04080282 | A | | 3/1992 | |
| JP | 2011021081 | A | | 2/2011 | |
| JP | 2011021081 | A | * | 2/2011 | |
| JP | 2017088717 | A | | 5/2017 | |
| KR | 1020120073122 | A | | 7/2012 | |
| KR | 20160133830 | A | | 11/2016 | |
| KR | 1020160143562 | A | | 12/2016 | |
| KR | 1020160143566 | A | | 12/2016 | |
| KR | 101729299 | B1 | | 4/2017 | |
| KR | 101759719 | B1 | | 7/2017 | |
| KR | 1020180085377 | A | | 7/2018 | |
| KR | 1887638 | B1 | * | 8/2018 | ................ C08F 2/18 |
| KR | 101956136 | B1 | | 3/2019 | |
| WO | 2014021277 | A1 | | 2/2014 | |
| WO | 2015080367 | A1 | | 6/2015 | |
| WO | 2017099397 | A1 | | 6/2017 | |
| WO | 2019066496 | A1 | | 4/2019 | |

* cited by examiner

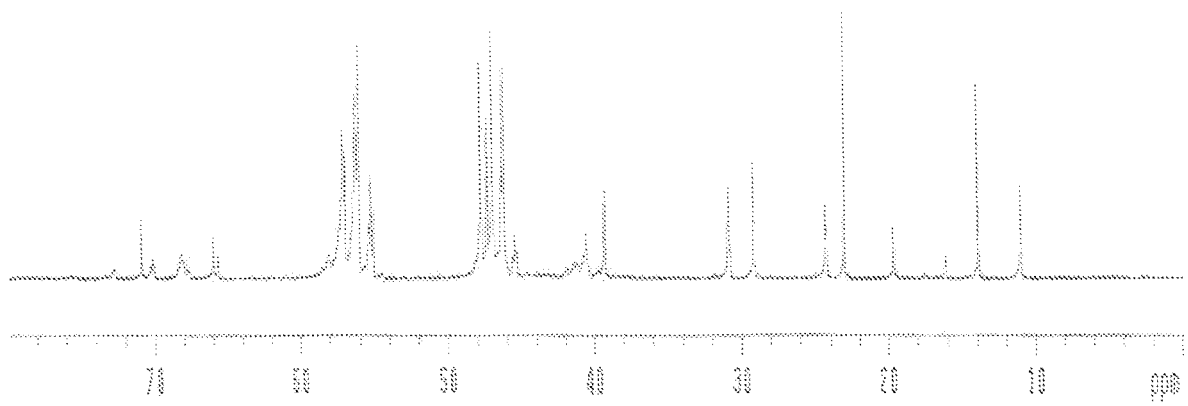

VINYL CHLORIDE-BASED COPOLYMER AND PREPARATION METHOD THEREOF

CROSS-REFERENCE TO RELATED APPLICATION

The present application is based on, and claims priority from, Korean Patent Application No. 10-2018-0088888, filed on Jul. 30, 2018, the disclosure of which is hereby incorporated by reference herein in its entirety.

TECHNICAL FIELD

The present invention relates to a vinyl chloride-based copolymer and a preparation method thereof.

BACKGROUND ART

For inks, paints, coatings, adhesives, etc., binder resins are used in order to improve pigment dispersion and adhesion performance. Polymer materials used as the binder resin generally include an acrylic resin, a vinyl-based resin, a urethane-based resin, etc.

Among them, the vinyl chloride-based resin may be obtained in the form of fine particles by using a vinyl chloride monomer alone, or by mixing a mixture of a vinyl chloride monomer and another comonomer that is copolymerizable therewith, a suspending agent, a buffer, a polymerization initiator, etc., and then drying a polyvinyl chloride-based resin slurry produced by a suspension polymerization method.

Specifically, a vinyl chloride-based resin may use vinyl chloride, vinyl acetate, and hydroxyl, carboxylic acid monomers, and has excellent adhesiveness to metals and various plastic materials, and thus it has been widely used in fields of Gravure ink binders and adhesives for food packaging.

Meanwhile, in the ink field, polyurethane (PU), ethylene vinyl acetate (EVA), etc. is blended with a vinyl chloride-based resin as a binder resin. However, unlike a vinyl chloride-based resin prepared by saponification treatment, a vinyl chloride-based resin prepared by non-saponification treatment is not compatible with EVA, and therefore, there is a limit to its application field.

To solve this problem, a hydroxyl-vinyl chloride-vinyl acetate copolymer having excellent compatibility with EVA was developed by non-saponification treatment, but it also showed ink agglomeration and color deterioration over time.

DISCLOSURE

Technical Problem

There is provided a novel structure of a copolymer, which is prepared by non-saponification treatment and has excellent compatibility with vinyl acetate, wherein an ink prepared by using a vinyl chloride-based resin composition including the copolymer exhibits excellent ink dispersibility and ink color.

There is provided a method of preparing the copolymer.

There are also provided a vinyl chloride-based resin composition including the copolymer, and a coating ink including the composition.

Technical Solution

According to one embodiment of the present invention, there is provided a copolymer of a vinyl chloride-based monomer, a dicarboxylic acid ester monomer having a linear, branched, or cyclic alkyl group having 10 to 30 carbon atoms, and a hydroxyl-based monomer.

According to another embodiment of the present invention, there is provided a method of preparing the copolymer, the method including the step of: polymerizing the vinyl chloride-based monomer, the dicarboxylic acid ester monomer having a linear, branched, or cyclic alkyl group having 10 to 30 carbon atoms, and the hydroxyl-based monomer in the presence of an initiator, wherein introduction of the vinyl chloride-based monomer is divided into first introduction which is performed before the polymerization; and second introduction which is performed within 100 minutes after reaching the polymerization temperature, or when the pressure in a reactor decreases to 0.5 kgf/cm$^2$ to 1.0 kgf/cm$^2$, as compared to the initial polymerization pressure.

Further, according to still another embodiment of the present invention, there are provided a vinyl chloride-based resin composition including the copolymer, and a coating ink including the vinyl chloride-based resin composition.

Hereinafter, a copolymer, a preparation method thereof, a vinyl chloride-based resin composition including the copolymer, and a coating ink including the vinyl chloride-based resin composition according to embodiments of the present invention will be described in more detail.

Unless mentioned otherwise, technical terms are only for the purpose of describing particular embodiments and is not intended to be limiting of the invention.

The singular forms used herein are intended to include plural forms as well, unless the context clearly indicates otherwise.

The term 'including', as used herein, specify stated features, regions, integers, steps, operations, elements, or components, but do not preclude the addition of other features, regions, integers, steps, operations, elements, or components.

As a result of continuous studies of the present inventors, it was confirmed that when a copolymer is prepared by using a vinyl chloride-based monomer, a dicarboxylic acid ester monomer, and a hydroxyl-based monomer, wherein the copolymer is prepared by reducing the content of a hydrophilic monomer such as the hydroxyl-based monomer, and introducing the dicarboxylic acid ester monomer which is a reactive plasticizer having bulky and hydrophobic hydrocarbon groups, it is possible to prepare a vinyl chloride-based resin composition having excellent compatibility with ethylene vinyl acetate (EVA) even by non-saponification treatment.

Further, according to the studies of the present inventors, it was also confirmed that when the monomer which is a reactive plasticizer having relative hydrophobicity, as compared with vinyl acetate, is introduced at a high ratio, the vinyl chloride-based resin composition including the copolymer may have excellent compatibility with EVA and may also improve properties such as ink dispersibility, color, etc.

Furthermore, in the present invention, by dividing introduction of the vinyl chloride-based monomer during preparation of the copolymer, the monomer in the prepared resin is distributed without regularity, and as a result, the vinyl chloride-based resin composition including the copolymer may have improved solubility for an acetate-based solvent, and thus transparency of the vinyl chloride-based resin composition and storage stability of the solution may be improved.

I. Copolymer

According to one embodiment of the present invention, there is provided a copolymer of a vinyl chloride-based monomer, a dicarboxylic acid ester monomer having a linear, branched, or cyclic alkyl group having 10 to 30 carbon atoms, and a hydroxyl-based monomer.

The copolymer may include 8 parts by weight to 15 parts by weight of the dicarboxylic acid ester monomer having a linear, branched, or cyclic alkyl group having 10 to 30 carbon atoms; and 1 part by weight to 9 parts by weight of the hydroxyl-based monomer with respect to 100 parts by weight of the vinyl chloride-based monomer, and specifically, 10 parts by weight to 15 parts by weight of the dicarboxylic acid ester monomer having a linear, branched, or cyclic alkyl group having 10 to 30 carbon atoms; and 5 parts by weight to 8 parts by weight of the hydroxyl-based monomer with respect to 100 parts by weight of the vinyl chloride-based monomer.

The dicarboxylic acid ester monomer having a linear, branched, or cyclic alkyl group having 10 to 30 carbon atoms may be one or more compounds selected from the group consisting of dipentyl maleate, dihexyl maleate, dioctyl maleate, and dinonyl maleate.

Specifically, the dicarboxylic acid ester monomer having a linear, branched, or cyclic alkyl group having 10 to 30 carbon atoms may be dioctyl maleate represented by the following Chemical Formula 1:

[Chemical Formula 1]

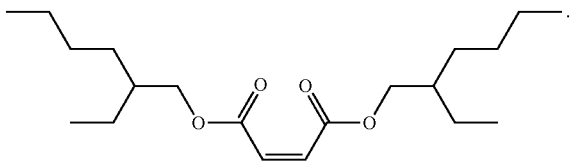

Such a dioctyl maleate having a bulky nonpolar 2-ethylhexyl structure may reduce a secondary binding force between polymer chains in the molecule by the bulky structure, and may increase the distance between molecular chains to lower viscosity when dissolved. The effect of improving pigment dispersibility may also be obtained by reducing cohesiveness between pigments of an ink including the same. In addition, due to the non-polar structure, when the content of dioctyl maleate is increased, the total Hansen solubility constant ($\delta t$) of the ink including the same decreases, thereby exhibiting excellent compatibility with EVA. DeletedTexts Specifically, the dicarboxylic acid ester monomer may be included in an amount of 8 parts by weight or more, 9 parts by weight or more, or 10 parts by weight or more, and 15 parts by weight or less with respect to 100 parts by weight of the vinyl chloride-based monomer.

The dicarboxylic acid ester monomer is preferably included in an amount of 8 parts by weight or more with respect to 100 parts by weight of the vinyl chloride-based monomer in order to exhibit the above-described ink stability effect by adding the dicarboxylic acid ester monomer to the copolymer.

However, when the dicarboxylic acid ester monomer is introduced in an excessive amount, the glass transition temperature (Tg) of the composition including the same is lowered due to plasticization, and thus it is difficult to dry the composition in a commercial process, and transparency of the ink solution may decrease. Therefore, the dicarboxylic acid ester monomer is most preferably included in an amount of 15 parts by weight or less with respect to 100 parts by weight of the vinyl chloride-based monomer.

The hydroxyl-based monomer may be one or more compounds selected from the group consisting of glycerol monoacrylate, hydroxyethyl acrylate, hydroxypropyl acrylate, hydroxyethyl methacrylate, hydroxypropyl methacrylamide, hydroxypolyethoxy allylether, hydroxypropyl methacrylate, pentaerythritol triacrylate, polypropylene glycol methacrylate, acryloethoxyhydroxybenzophenone, al lylhydroxyacetophenone, butoxystyrene, and methacryloxy hydrobenzophenone.

Specifically, the hydroxyl-based monomer may be included in an amount of 1 part by weight or more, 2 parts by weight or more, 3 parts by weight or more, 4 parts by weight or more, or 5 parts by weight or more; and 9 parts by weight or less, or 8 parts by weight or less with respect to 100 parts by weight of the vinyl chloride-based monomer.

When the hydroxyl-based monomer is used within the above content range, it is possible to improve transparency and ink dispersibility, i.e., glossiness, by imparting hydrophilicity to the vinyl chloride-based resin prepared by including the hydroxyl-based monomer, and stability of the ink may be improved by limiting the content of the hydroxyl-based monomer.

Further, a weight ratio of the dicarboxylic acid ester monomer having a linear, branched, or cyclic alkyl group having 10 to 30 carbon atoms and the hydroxyl-based monomer may be 1.5:1, or 1.6:1 or more, and 2:1, 1.9:1, or 1.8:1 or less.

When the weight ratio of the dicarboxylic acid ester monomer having a linear, branched, or cyclic alkyl group having 10 to 30 carbon atoms and the hydroxyl-based monomer is within the above range, transparency, viscosity, ink stability, glossiness, etc. may be at more excellent levels.

The copolymer prepared by including the monomers may be specifically represented by the following Chemical Formula 2, and more specifically, represented by the following Chemical Formula 2a:

[Chemical Formula 2]

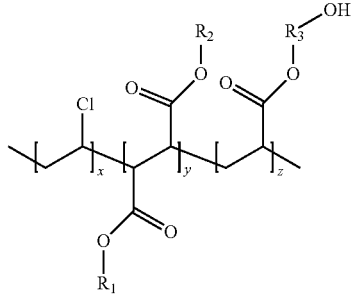

in Chemical Formula 2, x, y, and z are each independently an integer of 20 to 700, $R_1$ and $R_2$ are each independently a linear, branched, or cyclic alkyl group having 5 to 15 carbon atoms, $R_3$ is a linear or branched alkylene group having 1 to 10 carbon atoms.

Specifically, x, y, and z may be each independently 100 to 500, or 300 to 500.

[Chemical Formula 2a]

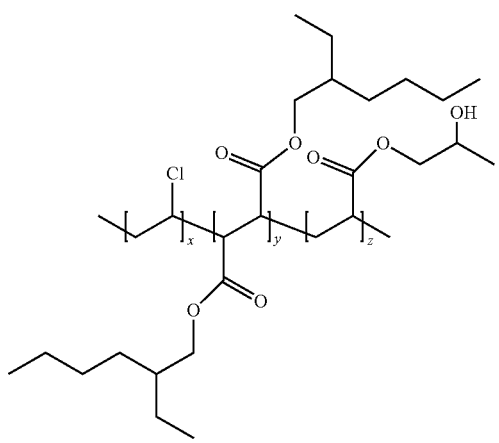

in Chemical Formula 2a, x, y, and z are the same as defined in Chemical Formula 2.

In other words, in a specific embodiment, the dicarboxylic acid ester monomer may be dioctyl maleate, and the hydroxyl monomer may be hydroxypropylacrylate.

Further, the copolymer may be further copolymerized with a polyethylene glycol-based additive including a (meth)acrylate group represented by the following Chemical Formula 3:

[Chemical Formula 3]

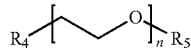

in Chemical Formula 3, n is an integer of 2 to 100, and $R_4$ and $R_5$ are each independently hydrogen, a hydrocarbyl group having 1 to 10 carbon atoms, or a (meth)acrylate group, wherein at least one of $R_4$ and $R_5$ is a (meth)acrylate group.

The compound represented by Chemical Formula 3 is a compound having one or more reactive functional groups in the molecule, and may be polymerized with the vinyl chloride-based monomer, and its molecular weight may be adjusted depending on the number of repeating units of ethylene glycol of Chemical Formula 3, that is, the value of n.

Specifically, n may be 2 to 50, or 2 to 20.

The polyethylene glycol-based additive including a (meth)acrylate group may increase compatibility with a pigment, and may increase a curing rate in the polymerization reaction, and impart hydrophilicity to the vinyl chloride-based resin prepared by including the additive.

The polyethylene glycol-based additive including a (meth)acrylate group may be one or more compounds selected from the group consisting of methoxypolyethylene glycol acrylate, methoxypolyethylene glycol (meth)acrylate, ethoxypolyethylene glycol acrylate, ethoxypolyethylene glycol (meth)acrylate, aryloxypolyethylene glycol acrylate, aryloxypolyethylene glycol (meth)acrylate, polyethylene glycol diacrylate, and polyethylene glycol di(meth)acrylate.

The polyethylene glycol-based additive including a (meth)acrylate group may be included in an amount of 0.1 part by weight to 5 parts by weight with respect to 100 parts by weight of the vinyl chloride-based monomer.

Specifically, the polyethylene glycol-based additive including a (meth)acrylate group may be included in an amount of 0.1 part by weight or more, 0.2 parts by weight or more, 0.3 parts by weight or more, 0.4 parts by weight or more, or 0.5 parts by weight or more; and 5.0 parts by weight or less, 4.5 parts by weight or less, 4.0 parts by weight or less, 3.5 parts by weight or less, 3.0 parts by weight or less, 2.5 parts by weight or less, 2.0 parts by weight or less, or 1.0 part by weight or less with respect to 100 parts by weight of the vinyl chloride-based monomer.

The polyethylene glycol-based additive may be preferably included in an amount of 0.1 part by weight or more with respect to 100 parts by weight of the vinyl chloride-based monomer in order to exhibit the above-described effect by adding the corresponding component.

However, when the component is excessively applied, unreacted additives remain after completion of the polymerization, which may impair properties of the copolymer. Therefore, the polyethylene glycol-based additive may be preferably included in an amount of 5 parts by weight or less with respect to 100 parts by weight of the vinyl chloride-based monomer.

II. Method of Preparing Copolymer

According to another embodiment of the present invention, there is provided a method of preparing the copolymer, the method including the step of: polymerizing the vinyl chloride-based monomer, the dicarboxylic acid ester monomer having a linear, branched, or cyclic alkyl group having 10 to 30 carbon atoms, and the hydroxyl-based monomer in the presence of an initiator, wherein introduction of the vinyl chloride-based monomer is divided into first introduction which is performed before the polymerization; and second introduction which is performed within 100 minutes after reaching the polymerization temperature, or when the pressure in a reactor decreases to 0.5 kgf/cm² to 1.0 kgf/cm², as compared to the initial polymerization pressure.

In the method of preparing the copolymer, the hydroxyl-based monomer and the dicarboxylic acid ester monomer having bulky and hydrophobic hydrocarbon groups are introduced as the monomers. Therefore, the vinyl chloride-based resin composition including the copolymer prepared by the above method may exhibit excellent compatibility with EVA, and in particular, may have excellent ink stability and dispersibility, and may solve ink agglomeration and color deterioration over time.

The method of preparing the copolymer is performed by including the step of polymerizing the vinyl chloride-based monomer, the dicarboxylic acid ester monomer having a linear, branched, or cyclic alkyl group having 10 to 30 carbon atoms, and the hydroxyl-based monomer in the presence of an initiator.

The monomers may be introduced into a reactor at the same time, or separately introduced at an optimized time depending on the kinds thereof.

Specifically, introduction of the vinyl chloride-based monomer is divided into first introduction which is performed before the polymerization; and second introduction which is performed within 100 minutes after reaching the polymerization temperature, or when the pressure in the reactor decreases to 0.5 kgf/cm² to 1.0 kgf/cm², as compared to the initial polymerization pressure.

When the introduction is divided, the monomers in the prepared polymer are irregularly distributed, and as a result, excellent solubility for a solvent, particularly, an acetate-based solvent, may be exhibited. In addition, transparency and glossiness of the vinyl chloride-based resin composition including the copolymer prepared as described above may be improved.

More specifically, first introduction of the vinyl chloride-based monomer is performed in an amount of 10% by weight to 90% by weight, specifically, 40% by weight to 60% by weight, and more specifically 50% by weight of the total input amount, before the polymerization, i.e., initiation of the polymerization. The rest of the vinyl chloride-based monomer, i.e., 10% by weight to 90% by weight, specifically 40% by weight to 60% by weight, and more specifically, 50% by weight of the total input amount may be secondarily introduced continuously or discontinuously within 100 minutes after the temperature in the reactor reaches the polymerization temperature, or when the pressure in the reactor decreases to 0.5 kgf/cm$^2$ to 1.0 kgf/cm$^2$, as compared to the initial polymerization pressure.

As described above, when the timing of divided introduction and the amount are controlled at the same time, irregularity of the monomer distribution in the polymer is further increased, and as a result, solubility for the solvent may be improved, and transparency and glossiness, together with storage stability, of the vinyl chloride-based resin composition including the copolymer thus prepared may be improved.

Meanwhile, in the method of preparing the copolymer according to embodiments of the present invention, the dicarboxylic acid ester monomer having a linear, branched, or cyclic alkyl group having 10 to 30 carbon atoms is used.

As the dicarboxylic acid ester monomer having a linear, branched, or cyclic alkyl group having 10 to 30 carbon atoms, one or more compounds selected from the group consisting of dipentyl maleate, dihexyl maleate, dioctyl maleate, and dinonyl maleate may be used.

Specifically, the dicarboxylic acid ester monomer having a linear, branched, or cyclic alkyl group having 10 to 30 carbon atoms may be dioctyl maleate represented by the following Chemical Formula 1:

[Chemical Formula 1]

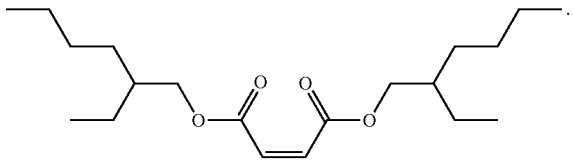

Further, the dicarboxylic acid ester monomer may be added in an amount of 8 parts by weight or more, or 9 parts by weight or more, or 10 parts by weight or more; and 15 parts by weight or less with respect to 100 parts by weight of the vinyl chloride-based monomer.

Meanwhile, as the hydroxyl-based monomer, one or more compounds selected from the group consisting of glycerolmonoacrylate, hydroxyethyl acrylate, hydroxypropylacrylate, hydroxyethylmethacrylate, hydroxypropylmethacrylamide, hydroxypolyethoxyallylether, hydroxypropylmethacrylate, pentaerythritol triacrylate, polypropylene glycolmethacrylate, acryloethoxyhydroxybenzophenone, allylhydroxyacetophenone, butoxystyrene, and methacryloxyhydrobenzophenone may be used.

The hydroxyl-based monomer may be added in an amount of 1 part by weight or more, 2 parts by weight or more, 3 parts by weight or more, 4 parts by weight or more, or 5 parts by weight or more; and 9 parts by weight or less, or 8 parts by weight or less with respect to 100 parts by weight of the vinyl chloride-based monomer.

The hydroxyl-based monomer may be introduced with the other monomers at the same time before the polymerization or before initiation of the polymerization. Further, the hydroxyl-based monomer may be introduced alone within 100 minutes after the temperature in the reactor reaches the polymerization temperature, or when the pressure in the reactor decreases to 0.5 kgf/cm$^2$ to 1.0 kgf/cm$^2$, as compared to the initial polymerization pressure.

When the hydroxyl-based monomer is introduced with the other monomers before the polymerization, most of the molecules react at the initial stage of polymerization. However, when the hydroxyl-based monomer is introduced alone at a specific time point, it is distributed throughout the prepared copolymer, and thus the overall transparency and glossiness of the vinyl chloride-based resin composition including the same may be evenly improved.

Further, a weight ratio of the dicarboxylic acid ester monomer having a linear, branched, or cyclic alkyl group having 10 to 30 carbon atoms, and the hydroxyl-based monomer may be 1.5:1, 1.6:1 or more, and 2:1 or 1.9:1, or 1.8:1 or less.

When the weight ratio of the dicarboxylic acid ester monomer having a linear, branched, or cyclic alkyl group having 10 to 30 carbon atoms and the hydroxyl-based monomer is within the above range, transparency, viscosity, ink stability, glossiness, etc. may be at more excellent levels.

Meanwhile, in the method of preparing the copolymer, a polyethylene glycol-based additive including a (meth)acrylate group may be further introduced, together with the above-described monomers, in the polymerization.

Specifically, the polyethylene glycol-based additive including a (meth)acrylate group may be represented by the following Chemical Formula 3:

[Chemical Formula 3]

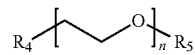

in Chemical Formula 3,
n is an integer of 2 to 100, and
$R_4$ and $R_5$ are each independently hydrogen, a hydrocarbyl group having 1 to 10 carbon atoms, or a (meth)acrylate group, wherein at least one of $R_4$ and $R_5$ is a (meth)acrylate group.

The polyethylene glycol-based additive including a (meth)acrylate group may preferably have a weight average molecular weight (Mw) of 200 g/mol to 5000 g/mol.

Specifically, the polyethylene glycol-based additive may have a weight average molecular weight of 200 g/mol or more, 250 g/mol or more, 300 g/mol or more, 350 g/mol or more, 400 g/mol or more, 450 g/mol or more, or 500 g/mol or more; and 5000 g/mol or less, 4500 g/mol or less, 4000 g/mol or less, 3500 g/mol or less, 3000 g/mol or less, 2500 g/mol or less, 2000 g/mol or less, 1500 g/mol or less, or 1000 g/mol or less.

The polyethylene glycol-based additive having a weight average molecular weight in the above range has excellent compatibility with the vinyl chloride-based monomer, and improves plasticity, dispersibility and polymerizability of the monomer mixture during the polymerization process. Thus, transparency and glossiness of the vinyl chloride-based resin composition including the prepared copolymer may be improved.

As the polyethylene glycol-based additive including a (meth)acrylate group, one or more compounds selected from the group consisting of methoxypolyethylene glycol acrylate, methoxypolyethylene glycol (meth)acrylate, ethoxypolyethylene glycol acrylate, ethoxypolyethylene glycol (meth)acrylate, aryloxypolyethylene glycol acrylate, aryloxypolyethylene glycol (meth)acrylate, polyethylene glycol diacrylate, and polyethylene glycol di(meth)acrylate may be used.

Further, the polyethylene glycol-based additive including a (meth)acrylate group may be introduced in an amount of 0.1 part by weight to 5 parts by weight with respect to 100 parts by weight of the vinyl chloride-based monomer.

Specifically, the polyethylene glycol-based additive including a (meth)acrylate group may be introduced in an amount of 0.1 part by weight or more, 0.2 parts by weight or more, 0.3 parts by weight or more, 0.4 parts by weight or more, or 0.5 parts by weight or more; and 5.0 parts by weight or less, 4.5 parts by weight or less, 4.0 parts by weight or less, 3.5 parts by weight or less, 3.0 parts by weight or less, 2.5 parts by weight or less, 2.0 parts by weight or less, or 1.0 parts by weight or less with respect to 100 parts by weight of the vinyl chloride-based monomer.

The polyethylene glycol-based additive may be introduced together with the other monomers at the same time before the polymerization or before initiation of the polymerization. Further, the polyethylene glycol-based additive may be introduced alone at the time point when the degree of polymerization of the other monomers is 30% to 80%.

Further, according to embodiments of the present invention, an organotin compound represented by the following Chemical Formula 4, an initiator, a suspending agent, an emulsifier or the like may be optionally introduced, when the monomers are introduced for the polymerization:

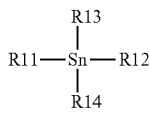

[Chemical Formula 4]

in Chemical Formula 4,
Sn is tin, and
R11 to R14 are each independently any one of hydrogen, a mercapto group (—SH), a linear or branched alkyl group having 1 to 15 carbon atoms, or a linear or branched alkylsulfanyl group having 1 to 15 carbon atoms.

Specifically, as the organotin compound, one or more compounds selected from the group consisting of tetramethyl tin, tetrabutyl tin, monomethyl tin mercaptide, octyl tin mercaptide, and dioctyl tin mercaptide may be used.

The organotin compound may act as a thermal stabilizer in the polymerization reaction to prevent discoloration.

The organotin compound may be included in an amount of 0.1 part by weight to 5 parts by weight with respect to 100 parts by weight of the vinyl chloride-based monomer.

Specifically, the organotin compound may be included in an amount of 0.1 part by weight or more, 0.15 parts by weight or more, or 0.2 parts by weight or more; and 5.0 parts by weight or less, 4.0 parts by weight or less, 3.0 parts by weight or less, 2.0 parts by weight or less, or 1.0 part by weight or less with respect to 100 parts by weight of the vinyl chloride-based monomer.

When the organotin compound is used in the above content range, it is possible to prevent delay of the polymerization reaction time or reduction of the productivity due to a change in the content of molecules acting as a polymerization retarder.

The organotin compound may be introduced at once before the polymerization, i.e., before initiation of the polymerization reaction.

Meanwhile, as the initiator, any one or more compounds of water-soluble initiators and oil-soluble initiators may be used.

Non-limiting examples of the oil-soluble initiators may include one or more compounds selected from the group consisting of t-butyl peroxyneodecanoate, diisopropyl peroxydicarbonate, methyl ethyl ketone peroxide, di-2-ethylhexyl peroxydicarbonate, di-3-methoxybutyl peroxydicarbonate, t-butyl peroxypivalate, t-amyl peroxypivalate, and t-hexyl peroxypivalate.

The oil-soluble initiator may be used in an amount of 0.01 part by weight to 1.00 part by weight, specifically, 0.02 parts by weight to 0.50 parts by weight, and more specifically 0.02 parts by weight to 0.25 parts by weight with respect to 100 parts by weight of the monomer mixture including the vinyl chloride-based monomer, the dicarboxylic acid ester monomer having a linear, branched, or cyclic alkyl group having 10 to 30 carbon atoms, and the hydroxyl-based monomer. When the oil-soluble initiator is used within the above content range, the polymerization reactivity is excellent and the polymerization reaction heat may be easily controlled.

Non-limiting examples of the water-soluble initiator may include one or more compounds selected from the group consisting of potassium persulfate, ammonium persulfate, sodium persulfate, sodium bisulfate, and sodium hydrosulfite.

Further, the oil-soluble initiator and the water-soluble initiator may be used as the initiators after mixing them at a weight ratio of 95:5 to 5:95, specifically, 90:10 to 10:90. When the oil-soluble initiator and the water-soluble initiator are mixed within the above ratio range, productivity may be improved by appropriately controlling the polymerization time.

Meanwhile, the polymerization reaction may be performed under stirring.

The stirring process may be performed according to a common method.

According to embodiments of the present invention, the stirring process may be performed by increasing the stirring speed within 100 minutes after the temperature in the reactor reaches the polymerization temperature; or when the pressure in the reactor decreases to 0.5 kgf/cm² to 1.0 kgf/cm², as compared to the initial polymerization pressure.

Specifically, the stirring may be performed at a speed of 100 ppm to 500 ppm at the initial stage of polymerization, and then within 100 minutes after the temperature in the reactor reaches the polymerization temperature; or at a speed higher than the stirring speed at the initial stage of polymerization, specifically, 1.5 times to 5 times higher than the stirring speed at the initial stage of polymerization, when the pressure in the reactor decreases to 0.5 kgf/cm² to 1.0 kgf/cm², as compared to the initial polymerization pressure.

By increasing the stirring speed under such conditions during polymerization, irregularity of the monomer distribution in the prepared polymer may be increased, and thus solubility of the composition including the same for the solvent may be increased, and cohesiveness may be further decreased to improve storage stability.

More specifically, when the time point of increase of the stirring speed approaches the time point of reaching the polymerization temperature, more specifically, when the time point of increase of the stirring speed coincides with the time point of reaching the polymerization temperature, the stirring speed is increased by 1.5 times to 5 times higher than the stirring speed at the initial stage of polymerization, which makes it possible to exhibit excellent stability in which no phase separation phenomenon occurs.

Meanwhile, according to embodiments of the present invention, the polymerization may be suspension polymerization, micro-suspension polymerization, or emulsion polymerization.

For example, in the case of the suspension polymerization or the micro-suspension polymerization, the above-described components are mixed and polymerized by suspension polymerization to prepare a slurry, from which unreacted monomers are removed. Then, the slurry, from which unreacted monomers are removed, is dehydrated and dried. In this regard, the method of introducing the respective components is the same as described above.

During the suspension polymerization or micro-suspension polymerization, polymerization water at room temperature or at a high temperature may be used as a reaction medium, and the monomers and a dispersant are uniformly dispersed in the polymerization water, and the oil-soluble initiator is decomposed at a predetermined temperature, for example, at 50° C. to 70° C., and polymerization may proceed by a chain reaction with the vinyl chloride-based monomer. Thereafter, when a reaction conversion rate of the monomer mixture reaches a predetermined level, polymerization may be terminated.

According to embodiments of the present invention, one or more additives of the suspending agent and the emulsifier may be optionally further introduced during the polymerization process.

Specifically, as the suspending agent, polyvinyl alcohol, cellulose, gelatin, an acrylic acid polymer, a methacrylic acid polymer, an itaconic acid polymer, a fumaric acid polymer, a maleic acid polymer, a succinic acid polymer, or a combination thereof, which have a degree of saponification of 40% or more, and more specifically 40%-90% of partially saponified polyvinyl acetate, may be used.

The suspending agent may be used in an amount of 0.01 part by weight to 5 parts by weight, 0.03 parts by weight to 5 parts by weight, or 0.05 parts by weight to 3.5 parts by weight with respect to 100 parts by weight of the monomer mixture. When the suspending agent is used within the above content range, a uniform size of the resin particles including the copolymer may be generated.

As the emulsifier, an anionic emulsifier, a non-ionic emulsifier, or a mixture thereof may be used.

The anionic emulsifier may specifically include an alkali metal salt or ammonium salt of fatty acid having 6 to 20 carbon atoms, an alkali metal salt or ammonium salt of alkylsulfonic acid having 6 to 20 carbon atoms, an alkali metal salt or ammonium salt of alkylbenzenesulfonic acid having 6 to 20 carbon atoms, an alkali metal salt or ammonium salt of alkylsulfate having 6 to 20 carbon atoms, an alkali metal salt or ammonium salt of alkyldisulfonic acid diphenyl oxide having 6 to 20 carbon atoms, or a combination thereof.

As the nonionic emulsifier, alcohol having 6 to 20 carbon atoms, polyethylene oxide, polyoxyethylene alkyl phenyl ether, polyoxyethylene alkyl ether, sorbitan monolaurate, polyvinyl alcohol, polyethylene glycol, or a combination thereof may be used.

The emulsifier may be introduced in an amount of 0.005 parts by weight to 1.0 part by weight, 0.01 part by weight to 0.5 parts by weight, or 0.01 part by weight to 0.1 part by weight with respect to 100 parts by weight of the monomer mixture. When the emulsifier is used in the above content range, it is possible to improve polymerization conversion and particle stability of the hydroxyl-based monomer, which is highly water-soluble, as compared with the vinyl chloride-based monomer.

When a mixture of the anionic emulsifier and the nonionic emulsifier is used, the anionic emulsifier and the nonionic emulsifier may be mixed at a weight ratio of 1:0.5 to 1:200, 1:2 to 1:100, or 1:2 to 1:50 within the above content range of the emulsifier.

When the anionic emulsifier and the nonionic emulsifier are mixed within the above weight ratio range, stability of the slurry may be ensured, and the heat transfer from the surface of the vinyl chloride-based resin including the copolymer to the inside of the resin may be maximally prevented.

When the emulsifier is used as the additive, and the water-soluble initiator is used as the initiator, the emulsifier and the water-soluble initiator may be used after mixing them at a weight ratio of 1:50 to 50:1, 1:20 to 20:1, 1:1 to 20:1, or 2:1 to 15:1.

The emulsifier or the water-soluble initiator induces formation of particle morphology distributed on the surface of the vinyl chloride-based resin including the copolymer, so as to minimize a change of a molecular structure by heat. Therefore, when the emulsifier or the water-soluble initiator are used after mixing them in the above ratio range, it is possible to obtain a resin having excellent glossiness while minimizing the reduction of adhesiveness due to use of the emulsifier.

In the copolymer prepared according to the above method, the content of the relatively hydrophilic hydroxyl-based monomer was reduced, and the dicarboxylic acid ester monomer was introduced at a high ratio as the reactive plasticizer having a non-polar structure and hydrophobicity. Therefore, the vinyl chloride-based resin composition including the copolymer thus prepared may exhibit excellent compatibility with EVA. In addition, since the dicarboxylic acid ester monomer has a very bulky structure, a secondary binding force between polymer chains may be reduced, and the distance between molecular chains may be increased, and therefore, when the copolymer including the same is used in the resin composition, it is possible to improve pigment dispersibility by lowering viscosity during dissolution and lowering cohesiveness between pigments, and to prevent color deterioration and ink agglomeration over time.

I. Vinyl Chloride-Based Resin Composition

According to still another embodiment of the present invention, there is provided a vinyl chloride-based resin composition including the copolymer.

The vinyl chloride-based resin composition may include the above-described copolymer of the vinyl chloride-based monomer, the dicarboxylic acid ester monomer having a linear, branched, or cyclic alkyl group having 10 to 30 carbon atoms, and the hydroxyl-based monomer, and may further include other co(polymer), resin, additive, etc.

The vinyl chloride-based resin composition including the above-described copolymer may exhibit excellent compatibility with EVA, and high ink dispersibility and stability, and excellent color.

Further, the vinyl chloride-based resin composition may include the copolymer with increased distribution irregularity of the monomers, thereby exhibiting excellent solubility for a solvent, particularly, an acetate-based solvent, and as a result, transparency of the vinyl chloride-based resin composition and storage stability of the solution may be improved. Furthermore, excellent transparency and glossiness may be achieved.

III. Coating Ink

According to still another embodiment of the present invention, there is provided a coating ink including the vinyl chloride-based resin composition.

Since the coating ink includes the above-described vinyl chloride-based resin composition, it is excellent in compatibility with EVA, while reducing cohesiveness between pigments in the composition and improving pigment dispersibility. As a result, it is possible to secure stability and to prevent color deterioration over time, thereby providing excellent color for metals and various plastic materials.

The coating ink may be prepared by mixing the vinyl chloride-based resin composition with a solvent, a pigment, beads, etc., and then uniformly dispersing it using a shaker, etc.

Here, as the solvent, pigment, beads, etc. which may be added to the coating ink, common ingredients well known in the art to which the present invention pertains may be used without particular limitation.

BRIEF DESCRIPTION OF DRAWINGS

FIG. 1 shows an NMR graph of a copolymer prepared in Example 1.

DETAILED DESCRIPTION OF THE EMBODIMENTS

Hereinafter, preferred examples will be provided for better understanding of the present invention. However, the following examples are provided only for illustrating the present invention, but the present invention is not limited thereby.

Example 1

Oxygen was removed from a 280 L reactor using a vacuum pump. To the reactor, 40 kg of a vinyl chloride-based monomer, 10 kg of dioctyl maleate, 0.5 kg of Methoxy PEG600 Methacrylate as a polyethylene glycol-based additive, 0.19 kg of dioctiyltin mercaptide as an organotin compound, 3.0 kg of 3% aqueous solution of a cellulose-based suspending agent, and 76 g of azobisisobutyronitrile as an initiator were introduced together with in 150 L of deionized water. Polymerization was initiated under stirring at 350 rpm using a Brumagin impeller.

Immediately after raising the reactor temperature to 73° C., 6 kg of hydroxypropylacrylate was continuously introduced over 5 hours, and 40 kg of the vinyl chloride-based monomer was additionally introduced, when the reactor pressure decreased to 0.5 kgf/cm², as compared to the initial polymerization pressure, while increasing the stirring speed of the Brumagin impeller to 600 rpm.

The vinyl chloride-based monomer was additionally introduced over 316 minutes, and after introducing the vinyl chloride-based monomer, the polymerization was stopped, when the reactor pressure decreased to 1.0 kgf/cm², as compared to the initial polymerization pressure, and unreacted monomers were recovered and the polymerization was terminated. The polymerized slurry was dehydrated and dried to obtain particles of the vinyl chloride-based resin composition which is a copolymer having an average particle size of 150 μm.

NMR (13C-NMR) of the obtained copolymer is shown in FIG. 1

A weight average molecular weight (Mw) of the copolymer was 48,135 g/mol, and its yield was 71% (based on a final dry product).

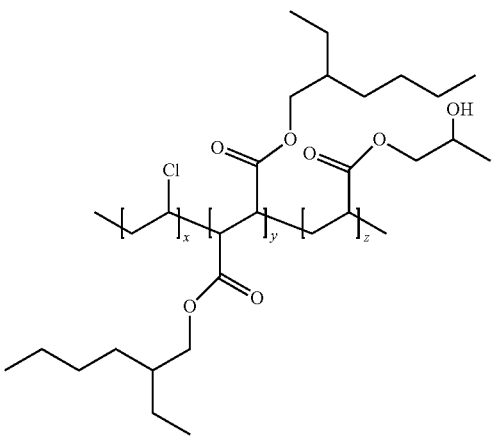

Example 2

Oxygen was removed from a 280 L reactor using a vacuum pump. To the reactor, 39 kg of a vinyl chloride monomer, 11 kg of dioctyl maleate, 0.5 kg of Methoxy PEG600 Methacrylate as a polyethylene glycol-based additive, 0.19 g of dioctiyltin mercaptide as an organotin compound, 3.0 kg of 3% aqueous solution of a cellulose-based suspending agent, and 76 g of azobisisobutyronitrile as an initiator were introduced together with in 150 L of deionized water. Polymerization was initiated under stirring at 350 rpm using a Brumagin impeller.

Immediately after raising the reactor temperature to 73° C., 6 kg of hydroxypropylacrylate was continuously introduced over 5 hours, and 39 kg of the vinyl chloride-based monomer was additionally introduced, when the reactor pressure decreased to 0.5 kgf/cm², as compared to the initial polymerization pressure, while increasing the stirring speed of the Brumagin impeller to 600 rpm.

The vinyl chloride-based monomer was additionally introduced over 306 minutes, and after introducing the vinyl chloride-based monomer, the polymerization was stopped, when the reactor pressure decreased to 1.0 kgf/cm², as compared to the initial polymerization pressure, and unreacted monomers were recovered and the polymerization was terminated. The polymerized slurry was dehydrated and dried to obtain particles of the vinyl chloride-based resin composition.

A weight average molecular weight (Mw) of the copolymer was 49.341 g/mol, and its yield was 73% (based on a final dry product).

Comparative Example 1

Oxygen was removed from a 280 L reactor using a vacuum pump. To the reactor, 43 kg of a vinyl chloride monomer, 5 kg of vinyl acetate monomer, 0.5 kg of Methoxy PEG600 Methacrylate as a polyethylene glycol-based additive, 0.19 g of dioctiyltin mercaptide as an organotin compound, 3.0 kg of 3% aqueous solution of a cellulose-based suspending agent, and 76 g of azobisisobutyronitrile as an initiator were introduced together with in 150 L of deionized water. Polymerization was initiated under stirring at 350 rpm using a Brumagin impeller.

Immediately after raising the reactor temperature to 73° C., 5 kg of hydroxypropylacrylate was continuously introduced over 250 minutes, and 43 kg of the vinyl chloride-based monomer was additionally introduced, when the reactor pressure decreased to 0.5 kgf/cm$^2$, as compared to the initial polymerization pressure, while increasing the stirring speed of the Brumagin impeller to 600 rpm.

The vinyl chloride-based monomer was additionally introduced over 336 minutes, and after introducing the vinyl chloride-based monomer, the polymerization was stopped, when the reactor pressure decreased to 1.0 kgf/cm$^2$, as compared to the initial polymerization pressure, and unreacted monomers were recovered and the polymerization was terminated. The polymerized slurry was dehydrated and dried to obtain particles of the vinyl chloride-based resin composition.

A weight average molecular weight (Mw) of the copolymer was 75.557 g/mol, and its yield was 73% (based on a final dry product).

Comparative Example 2

A saponified vinyl chloride-based resin composition particle (product name: Solbin® A, manufacturer: Shin-Etsu MicroSi, Inc.), which is a terpolymer of vinyl chloride, vinyl alcohol, and vinyl acetate, was prepared.

Preparation Examples 1-A to 1-D

20% by weight of each vinyl chloride-based resin composition particles obtained in Examples and Comparative Examples was mixed with 40% by weight of ethyl acetate, and 40% by weight of toluene, and stirred at 50° C. for 90 minutes to prepare a mixed solution of Preparation Example corresponding to each of Examples and Comparative Examples.

Preparation Examples 2-A to 2-D 25 g of each of the mixed solutions according to Preparation Examples 1-A to 1-D, 8 g of pigment (Red 57:1), 17.3 g of ethyl acetate, 11.0 g of toluene, 4.0 g of methyl ethyl ketone, 7.0 g of methyl isobutyl ketone, 35 g of beads (product name: Alumina Bead, manufacturer: SamHwa ceramic), and 27.5 g of an ethylene vinyl acetate solution (product name: EVATANE® 42-60, 20% in Toluene, manufacturer: Arkema) were mixed, and stirred for 1 hr using an ink shaker to prepare each red coating ink corresponding to Examples and Comparative Examples.

Preparation Examples 3-A to 3-D

The same components as in Preparation Examples 2-A to 2-D were mixed, except that pigment (Blue 15.3) was used instead of pigment (Red 57:1), and stirred for 1 hr using an ink shaker to prepare each blue coating ink corresponding to Examples and Comparative Examples.

Experimental Example 1

For the mixed solutions according to Preparation Examples 1-A to 1-D, transparency of each solution was measured using an UV spectrometer (475 nm).

Experimental Example 2

After applying each of the red inks according to Preparation Examples 2-A to 2-D and each of the blue inks according to Preparation Examples 3-A to 3-D onto a PET film and drying them, glossiness was repeatedly measured five times using a gloss meter (BYK, micro-gloss) at 60°, and average values thereof were calculated, and color (color development, a* and b*) was repeatedly measured five times using a color analyzer (Konica Minolta, CR-400), and average values thereof were calculated.

Experimental Example 3

The mixed solutions according to Preparation Examples 1-A to 1-D, the red inks according to Preparation Examples 2-A to 2-D, and the blue inks according to Preparation Examples 3-A to 3-D were stored in an oven at 25° C. for 1 hr or longer, and then each of the mixed solutions was measured (sec) using a #4 size Ford Cup viscometer, and each of the red and blue inks was measured for viscosity (cps) at 100 rpm using a Brookfield viscometer equipped with a #4 size spindle. The degree of phase separation of each ink was observed over time. The results were relatively evaluated according to the following five levels: very excellent (⊚), excellent (○), good (▲), fair (Δ), and poor (X).

When stability of the ink is not good, layer separation of ink and aggregation of pigment occur within 1 hour after mixing the ink. When ink with poor stability is coated, the glossiness of the coating layer becomes relatively low.

TABLE 1

| Mixed solution | Resin composition | Transparency (%) | Viscosity (sec) |
| --- | --- | --- | --- |
| Preparation Example 1-A | Example 1 | 93 | 45 |
| Preparation Example 1-B | Example 2 | 88 | 37 |
| Preparation Example 1-C | Comparative Example 1 | 79 | 113 |
| Preparation Example 1-D | Comparative Example 2 | 86 | 79 |

TABLE 2

| Red ink | Resin composition | Viscosity (cps) | Glossiness (GU) | Color development (a*) | Ink stability (non-agglomeration) |
| --- | --- | --- | --- | --- | --- |
| Preparation Example 2-A | Example 1 | 88 | 14.5 | 59.5 | ⊚ |
| Preparation Example 2-B | Example 2 | 82 | 14.8 | 54.6 | ⊚ |
| Preparation Example 2-C | Comparative Example 1 | 227 | 10.4 | 51.6 | Δ |
| Preparation Example 2-D | Comparative Example 2 | 101 | 14.3 | 55.4 | ▲ |

TABLE 3

| Red ink | Resin composition | Viscosity (cps) | Glossiness (GU) | Color development (b*) | Ink stability (non-agglomeration) |
|---|---|---|---|---|---|
| Preparation Example 3-A | Example 1 | 103 | 21.7 | −58.4 | ◎ |
| Preparation Example 3-B | Example 2 | 76 | 19.2 | −58.0 | ◎ |
| Preparation Example 3-C | Comparative Example 1 | 171 | 17.5 | −54.3 | △ |
| Preparation Example 3-D | Comparative Example 2 | 92 | 24.1 | −58.6 | ○ |

As in Comparative Example 1, when vinyl acetate was included, instead of dioctyl maleate, the solution transparency, ink stability and glossiness (dispersibility) as well as the color development were inferior to those of Examples 1 and 2 according to the limit to the change of the monomer composition ratio. In addition, the viscosity of the solution and the ink rapidly increased, making it difficult to use for a long time in actual commercial application.

Meanwhile, it was confirmed that the vinyl chloride-based resin compositions of Examples 1 and 2 according to the present invention exhibited excellent transparency and also had equal or higher glossiness (dispersibility), stability, and color development, as compared with that of Comparative Example 5, which is an existing saponified vinyl chloride-based resin composition, and it was also confirmed that the compositions had viscosity suitable for use as a coating ink.

However, when the experimental results according to the addition amount of dioctyl maleate were compared (Example 1 and Example 2), it was confirmed that when the content of dioctyl maleate was increased, ink stability was improved and ink glossiness (dispersibility) was improved. However, when the content exceeds 15 parts by weight, based on 100 parts by weight of the vinyl chloride monomer, there was a problem in that transparency and color development of the solution were deteriorated. Accordingly, it is most preferable that dioctyl maleate is used in an amount of about 12.5 parts by weight, because the transparency and viscosity of the solution, and the ink stability and glossiness and color development exhibited excellent levels on average.

INDUSTRIAL AVAILABILITY

According to the present invention, there are provided a novel structure of a copolymer, a preparation method thereof, and a vinyl chloride-based resin composition including the copolymer. Particularly, there are provided a vinyl chloride-based resin composition exhibiting excellent compatibility with ethylene vinyl acetate while particularly exhibiting excellent ink dispersibility and ink color, and a coating ink including the vinyl chloride-based resin composition.

The invention claimed is:

1. A copolymer of a vinyl chloride monomer, a dicarboxylic acid ester monomer, a hydroxyl monomer and a polyethylene glycol monomer including a (meth) acrylate group represented by the following Chemical Formula 3,
   includes 8 parts by weight to 15 parts by weight of the dicarboxylic acid ester monomer and 1 part by weight to 9 parts by weight of the hydroxyl monomer with respect to 100 parts by weight of the vinyl chloride monomer,
   wherein a weight ratio of the dicarboxylic acid ester monomer, and the hydroxyl monomer is 1.5:1 to 2:1,
   wherein the dicarboxy acid ester monomer is one or more compounds selected from the group consisting of dipentyl maleate, dihexyl maleate, dioctyl maleate, and dinonyl maleate,

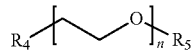

[Chemical Formula 3]

in Chemical Formula 3,
n is an integer of 2 to 100, and
$R_4$ and $R_5$ are each independently hydrogen, a hydrocarbyl group having 1 to 10 carbon atoms of a (meth) acrylate group, wherein at least one of $R_4$ and $R_5$ is a (meth) acrylate group.

2. The copolymer of claim 1,
wherein the copolymer includes 10 parts by weight to 15 parts by weight of the dicarboxylic acid ester monomer; and 5 part by weight to 8 parts by weight of the hydroxyl monomer with respect to 100 parts by weight of the vinyl chloride monomer.

3. The copolymer of claim 1,
wherein the dicarboxylic acid ester monomer is dioctyl maleate represented by the following Chemical Formula 1:

[Chemical Formula 1]

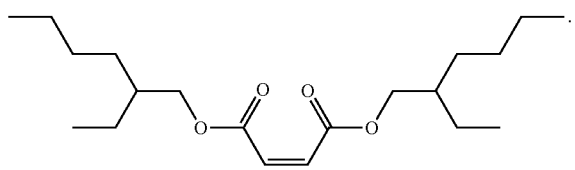

4. The copolymer of claim 1,
wherein the hydroxyl monomer includes one or more compounds selected from the group consisting of glycerolmonoacrylate, hydroxyethyl acrylate, hydroxypropylacrylate, hydroxyethylmethacrylate, hydroxypropylmethacrylamide, hydroxypolyethoxyallylether, hydroxypropylacrylate, hydroxypropylmethacrylate, pentaerythritol triacrylate, polypropylene glycolmethacrylate, acryloethoxyhydroxybenzophenone, allylhydroxyacetophenone, and methacryloxyhydrobenzophenone monomer.

5. The copolymer of claim 1,
wherein the polyethylene glycol monomer including a (meth)acrylate group is included in an amount of 0.1 part by weight to 5 parts by weight with respect to 100 parts by weight of the vinyl chloride-based monomer.

6. A method of preparing the copolymer of claim 1,
the method including the step of polymerizing the vinyl chloride monomer, the dicarboxylic acid ester monomer, the hydroxyl monomer, and the polyethylene glycol monomer in the presence of an initiator,
wherein introduction of the vinyl chloride monomer is divided into first introduction before the polymerization; and second introduction within 100 minutes after reaching the polymerization temperature, or when the pressure in a reactor decreases to 0.5 kgf/cm² to 1.0 kgf/cm², as compared to the initial polymerization pressure.

7. The method of claim 6,
wherein the vinyl chloride monomer is primarily introduced in an amount of 10% by weight to 90% by weight of the total input amount of vinyl chloride, before the polymerization, and the rest of the vinyl chloride monomer is secondarily introduced when the temperature in the reactor reaches the polymerization temperature.

8. The method of claim 6,
wherein the dicarboxylic acid ester monomer is dioctyl maleate represented by the following Chemical Formula 1:

[Chemical Formula 1]

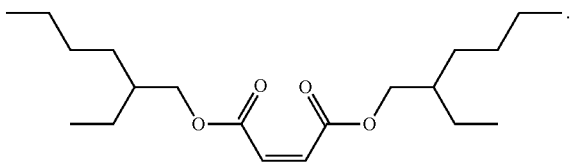

9. The method of claim 6,
wherein the dicarboxylic acid ester monomer is introduced in an amount of 8 parts by weight to 15 parts by weight with respect to 100 parts by weight of the vinyl chloride-based monomer.

10. The method of claim 6,
wherein the hydroxyl monomer includes one or more compounds selected from the group consisting of glycerolmonoacrylate, hydroxyethyl acrylate, hydroxypropylacrylate, hydroxyethylmethacrylate, hydroxypropylmethacrylamide, hydroxypolyethoxyallylether, hydroxypropylacrylate, hydroxypropylmethacrylate, pentaerythritol triacrylate, polypropylene glycolmethacrylate, acryloethoxyhydroxybenzophenone, allylhydroxyacetophenone, and methacryloxyhydrobenzophenone.

11. The method of claim 6,
wherein the hydroxyl monomer is introduced within 100 minutes after the temperature in the reactor reaches the polymerization temperature, or when the pressure in the reactor decreases to 0.5 kgf/cm$^2$ to 1.0 kgf/cm$^2$, as compared to the initial polymerization pressure.

12. The method of claim 6,
wherein the hydroxyl monomer is introduced in an amount of 1 part by weight to 9 parts by weight with respect to 100 parts by weight of the vinyl chloride-based monomer.

13. The method of claim 6,
wherein the polyethylene glycol monomer has a weight average molecular weight (Mw) of 200 g/mol to 5000 g/mol.

14. The method of claim 6,
wherein the polyethylene glycol monomer is introduced in an amount of 0.1 part by weight to 5 parts by weight with respect to 100 parts by weight of the vinyl chloride-based monomer.

15. The method of claim 6,
wherein the polyethylene glycol monomer is introduced before polymerization or at the time point when the degree of polymerization of the monomers is 30% to 80%.

16. The method of claim 6,
wherein the polymerization is performed under stirring, and
the stirring is performed by increasing the stirring speed within 100 minutes after the temperature in the reactor reaches the polymerization temperature; or when the pressure in the reactor decreases to 0.5 kgf/cm$^2$ to 1.0 kgf/cm$^2$, as compared to the initial polymerization pressure.

17. The method of claim 6,
wherein the polymerization is suspension polymerization, micro-suspension polymerization, or emulsion polymerization.

18. A Vinyl chloride-based resin composition comprising the copolymer of claim 1.

19. A coating ink comprising the vinyl chloride resin composition of claim 18.

* * * * *